United States Patent
Tu et al.

(10) Patent No.: US 12,258,084 B2
(45) Date of Patent: Mar. 25, 2025

(54) LIFT AXLE CONTROL METHOD AND SYSTEM FOR VEHICLE

(71) Applicant: Xiamen Yaxon Zhilian Technology Co., Ltd., Fujian (CN)

(72) Inventors: Yankai Tu, Fujian (CN); Junfang Lai, Fujian (CN); Gang Ji, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 218 days.

(21) Appl. No.: 18/247,181

(22) PCT Filed: Jul. 29, 2021

(86) PCT No.: PCT/CN2021/109093
§ 371 (c)(1),
(2) Date: Mar. 29, 2023

(87) PCT Pub. No.: WO2022/057458
PCT Pub. Date: Mar. 24, 2022

(65) Prior Publication Data
US 2024/0010284 A1    Jan. 11, 2024

(30) Foreign Application Priority Data

Sep. 15, 2020   (CN) .......................... 202010966489.3

(51) Int. Cl.
*B60G 17/015*    (2006.01)
*B62D 61/12*    (2006.01)

(52) U.S. Cl.
CPC ........... *B62D 61/12* (2013.01); *B60G 17/015* (2013.01); *B60G 2400/60* (2013.01); *B60G 2400/82* (2013.01)

(58) Field of Classification Search
CPC .............. B60G 17/015; B60G 17/0165; B60G 17/0198
See application file for complete search history.

(56) References Cited

U.S. PATENT DOCUMENTS 4,856,814 A     8/1989  Jones
6,145,859 A *  11/2000  Altherr .............. B60G 17/0416
                                                          280/124.159
(Continued)

FOREIGN PATENT DOCUMENTS

CN            1822982 A      8/2006
CN          104470750 A      3/2015
(Continued)

OTHER PUBLICATIONS

International Search Report cited in PCT/CN2021/109093 mailed Nov. 3, 2021, 6 pages.
(Continued)

*Primary Examiner* — Long T Tran
(74) *Attorney, Agent, or Firm* — Cooper Legal Group, LLC

(57) ABSTRACT

Disclosed in the present disclosure are a lift axle control method for a vehicle and a lift axle control system for a vehicle, wherein the method comprises the following steps: step 1) acquiring a load M of the vehicle; step 2) judging whether it needs to lower the lift axle according to the load, and if so, controlling the vehicle to lower the lift axle, and entering into step 3); otherwise, returning to step 1); step 3) calculating an optimal position of lifting the lift axle, controlling the vehicle to lift the lift axle at the optimal position, and entering into step 4); step 4) calculating an optimal position to lower the lift axle, controlling the vehicle to lower the lift axle at the optimal position, and then returning to step 3). The method of the present disclosure can reduce the damage to the road surface and achieve the economy of fuel consumption during running of the vehicle.

10 Claims, 1 Drawing Sheet

(56) References Cited

U.S. PATENT DOCUMENTS

| | | | |
|---|---|---|---|
| 2006/0170168 A1* | 8/2006 | Rotz | B62D 61/12 |
| | | | 180/209 |
| 2006/0267296 A1* | 11/2006 | Dodd | B60G 17/01908 |
| | | | 280/124.157 |
| 2008/0236437 A1 | 10/2008 | Shagbazyan | |
| 2014/0039767 A1* | 2/2014 | Jensen | B60K 23/0808 |
| | | | 701/50 |
| 2016/0332498 A1 | 11/2016 | Lindsay | |
| 2017/0259619 A1* | 9/2017 | Christ | B60B 35/04 |
| 2017/0326929 A1* | 11/2017 | Chmelar | G01P 15/00 |
| 2018/0148046 A1* | 5/2018 | Macnamara | B60G 17/052 |
| 2019/0359272 A1* | 11/2019 | Stross | B62D 53/068 |

FOREIGN PATENT DOCUMENTS

| | | |
|---|---|---|
| CN | 207173218 U | 4/2018 |
| CN | 207311027 U | 5/2018 |

OTHER PUBLICATIONS

Written Opinion cited in PCT/CN2021/109093 mailed Nov. 3, 2021, 7 pages.

* cited by examiner

LIFT AXLE CONTROL METHOD AND SYSTEM FOR VEHICLE

TECHNICAL FIELD

The present disclosure relates to the technical field of vehicles, in particular to a lift axle control method and system for a vehicle.

BACKGROUND

A lift axle of a heavy truck, also known as a suspension axle, is capable of being lifted or lowered freely, and is capable of making the axle and tires off the ground after being lifted. The lift axle is generally an auxiliary device without a driving force, which has good economic advantages. It can be lowered to carry the weight and effectively improve vibration reduction of the vehicle in the case of a heavy load, and reduce the pressure on a road surface to prevent damage to the road. In case of a light load, the axle can be lifted, and the tires of the suspension axle have no friction resistance with the ground, which can effectively reduce a fuel consumption of the vehicle.

However, lifting the axle of vehicle is prone to happen that a driver, in order to unilaterally pursue fuel consumption and economy, also make the axle lifted in case of the heavy load, which would damage the road surface. In order to solve this problem, an intelligent lift axle technology appears. For example, when the vehicle with a load detects that the load on a main shaft exceeds a standard value, the vehicle would automatically lower the lift axle, and the driver can not lift the lift axle anymore. The traditional technology does not take into account the influence of terrain changes on control of the lift axle. Under the same load, due to different slopes of the terrain, vertical pressures of the vehicle on the ground are also different. Therefore, even a vehicle with the heavy load is also capable of lifting the lift axle to achieve economy if the terrain meets certain conditions. Therefore, the economy can not be effectively realized by simply determining the lifting or lowering of the lift axle according to a load factor.

SUMMARY

In order to solve the technical problem existing in the prior art, the present disclosure provides a lift axle control method and system for a vehicle, so that the lift axle can be lifted and lowered dynamically with the change of terrains when the vehicle with the same load run on different terrains, which not only ensure no damage to a road surface, but also utilize the lift axle to achieve the economy of fuel consumption during running of the vehicle to a maximum extent.

To solve the technical problem, the present disclosure adopts the following technical solution: a lift axle control method for a vehicle, wherein the method comprises the following steps:
 step 1) acquiring a load M of the vehicle during running of the vehicle;
 step 2) judging whether the vehicle needs to lower the lift axle according to the load, and if so, controlling the vehicle to lower the lift axle, and then entering into step 3); otherwise, returning to step 1);
 step 3) acquiring the information of electronic horizon system in real time, calculating an optimal position of lifting the lift axle in a road ahead of a current position of the vehicle, controlling the vehicle to lift the lift axle when the vehicle reaches the optimal position of lifting the lift axle, and entering into step 4);
 step 4) calculating, by the electronic horizon system, an optimal position to lower the lift axle in the road ahead, controlling the vehicle to lower the lift axle when the vehicle reaches the optimal position to lower the lift axle, and then returning to step 3).

As a preferred solution of the present disclosure, in step 2), judging whether the vehicle needs to lower the lift axle according to whether the load M is greater than a threshold T; and if so, controlling the vehicle to lower the lift axle in the current position.

As a preferred solution of the present disclosure, in step 3), acquiring, by the vehicle, slope data of the road ahead of the current position of the vehicle from the electronic horizon system, and if the road ahead has a first slope of which the slope value is greater than a slope threshold Q, calculating the optimal position of lifting the lift axle in the road ahead.

As a preferred solution of the present disclosure, assuming that the vehicle has N stationary axles and at least one lift axle; and a formula for calculating the slope threshold Q is $Q=\arccos(NT/M)$, and T is the threshold.

As a preferred solution of the present disclosure, the optimal position for lifting the lift axle is a position with a distance of $vt_1$ from the first slope, where v is a running speed of the vehicle and $t_1$ is execution time for lifting the lift axle.

As a preferred solution of the present disclosure, in step 3), acquiring, by the vehicle, slope data of the road ahead of the current position of the vehicle from the electronic horizon system, and if the slope value of the road ahead is less than or equal to a slope threshold Q, controlling, by the vehicle, the lift axle to remain a lowered state.

As a preferred solution of the present disclosure, in step 4), after the vehicle enters the first slope, acquiring the slope data of the road ahead of the first slope from the electronic horizon system; and if the road ahead has a second slope of which the slope value is less than or equal to the slope threshold Q, calculating the optimal position for lowering the lift axle in the road ahead of the first slope.

As a preferred solution of the present disclosure, the optimal position for lowering the lift axle in the road ahead of the first slope is a position with a distance of $vt_2$ from the second slope, where, v is a running speed of the vehicle and $t_2$ is execution time for lowering the lift axle.

As a preferred solution of the present disclosure, in step 4), acquiring, by the vehicle, the slope data of the road ahead of the first slope from the electronic horizon system after the vehicle entering into the first slope, and if the slope value of the road ahead is greater than the slope threshold Q, controlling, by the vehicle, the lift axle to remain a lifting state.

A lift axle control system for a vehicle, wherein the system comprises a vehicle body, the vehicle body is provided with a lift axle, a stationary axle, a lifting controller and an actuator, the actuator is connected with the lift axle to perform a lifting or lowering operation, the lifting controller is connected with the actuator to control an action of the actuator, wherein, the lift axle control system further comprises an electronic horizon system and a load sensor which is connected with the lifting controller to detect a load of the vehicle; the lifting controller is further connected with the electronic horizon system to acquire slope data of a road ahead and to control the lifting or lowering of the lift axle according to a lift axle control method for a vehicle as described above.

Due to the use of the above technical solutions, compared with the prior art, the present disclosure has the following beneficial effects:

1. The method and system of the present disclosure judge whether the lift axle is suitable for being lifted or lowered and the optimal position for executing the action by predicting the terrain and combining the load, so that the lift axle is dynamically lifted or lowered as the terrain changes when the vehicle with the same load is driving on different terrains, which not only ensure no damage to the road surface, but also utilize the lift axle to achieve the economy of fuel consumption during running of the vehicle to the maximum extent.

2. The method and system of the present disclosure utilize the load of the vehicle and the preset threshold to calculate the slope threshold for adjusting the load bearing of a single axle; and judge, in the road ahead, whether the vehicle has the first slope for which the lift axle is needed to be lifted and the second slope for which the lift axle is needed to be lowered by combining the slope threshold, wherein the influence of different terrains on the load bearing of the axle is fully considered.

3. The method and system of the present disclosure predict the optimal position of the vehicle to lift the lift axle or lower the lift axle through the running speed of the vehicle and the execution time of the action of the lift axle, so that when the vehicle reaches the first slope or second slope, the lifting or lowering action of the lift axle can be completed exactly.

DESCRIPTION OF EMBODIMENTS

The technical solutions of the present disclosure are described in detail below with reference to the accompanying drawings and the embodiments.

Embodiments

In a transport vehicle, the vehicle is set to have N stationary axles and at least one lift axle. Generally, a weight of the vehicle would not change after the vehicle is loaded and starts to drive. At this time, a load weight of the vehicle is obtained by a load sensor as M. In a traditional lift axle control method, a threshold T is set in advance to judge whether to lift. Assuming that there is one lift axle, when M>T, the lift axle is controlled to be lowered and a truck becomes load-bearing of N+1 axles. A bearing weight of a single axle on a level road is M/(N+1) when the lift axle falls down, and the bearing weight of the single axle is M/N when the lift axle is lifted. The bearing weight difference therebetween is D=M/N−M/(N+1).

In addition, for the definition of the level road, the national highway engineering technical standards can be referred to. For example, roads of different grades of which slope is less than a maximum relaxation longitudinal slope is the level road. Alternatively, it can also be customized according to actual application requirements. For example, according to a user-defined rule, a slope range which is less than 1 degree and greater than minus 1 degree corresponds to the level road.

Figure 1:
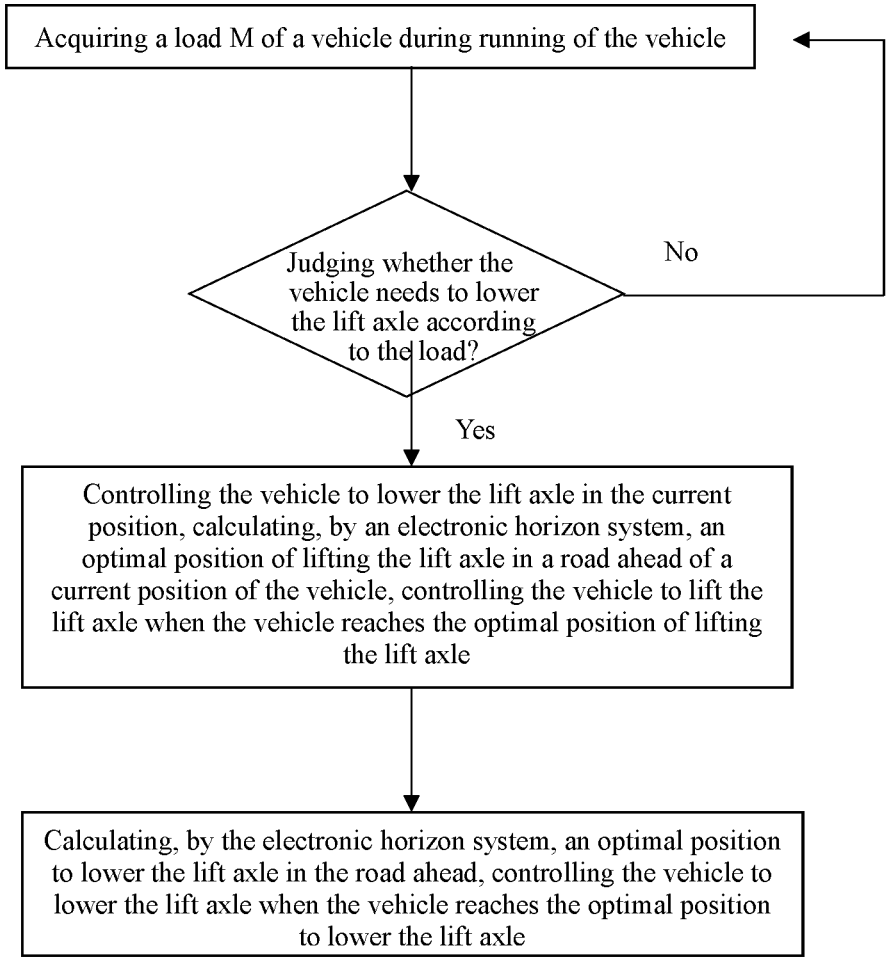
FIG. 1 is a flow diagram of a method according to the present disclosure.

As shown in FIG. 1, a lift axle control method for a vehicle according to the present disclosure, wherein the method comprises the following steps:

step 1) acquiring a load M of the vehicle during running of the vehicle, wherein the lift axle of the vehicle is in a lifted state by default.

step 2) judging whether the vehicle needs to lower the lift axle according to the load, and if so, controlling the vehicle to lower the lift axle, and then entering into step 3); otherwise, returning to step 1).

In this step, a conventional method is used to judge whether the vehicle needs to lower the lift axle. Preferably, according to whether the load M is greater than the threshold T, judging whether the vehicle needs to lower the lift axle; and if so, controlling the vehicle to lower the lift axle in a current position; otherwise, maintaining the lift axle in the lifted state, wherein the threshold T can be set according to a load condition of the vehicle, etc., and other judgment methods combined with the load can be used to judge whether the lift axle needs to be lowered.

step 3) acquiring the information of electronic horizon system in real time, calculating an optimal position of lifting the lift axle in a road ahead of a current position of the vehicle, controlling the vehicle to lift the lift axle when the vehicle reaches the optimal position of lifting the lift axle in the road ahead, and entering into step 4).

Specifically, acquiring, by the vehicle, slope data of the road ahead of the current position of the vehicle from the electronic horizon system after the vehicle is controlled to lower the lift axle, and if the road ahead has a first slope of which the slope value is greater than a slope threshold Q, calculating the optimal position of lifting the lift axle in the road ahead; and if the slope value of the road ahead is less than or equal to the slope threshold Q, controlling, by the vehicle, the lift axle to remain a lowered state as the lift axle does not need to be lifted.

In the present disclosure, the slope threshold Q is calculated based on the load M and threshold T at a current position. Assuming that when the slope is Q, an average vertical load bearing pressure of single axle after the lift axle is lifted is M cos(Q)/N. Letting M cos(Q)/N≤T, Q≥arccos (NT/M), the slope Q is taken as the slope threshold to control the change of the lift axle. The calculation formula is as follows:

$$Q = \arccos(NT/M).$$

Further, in order to make the vehicle exactly lift the lift axle when it reaches the first slope, the optimal position for lifting the lift axle is set as a position before the vehicle driving from the current position reaches the first slope. Preferably, the optimal position for lifting the lift axle is a position with a distance of $vt_1$ from the first slope, where v is a running speed of the vehicle and $t_1$ is execution time for lifting the lift axle.

step 4) calculating, by the electronic horizon system, an optimal position to lower the lift axle in the road ahead, controlling the vehicle to lower the lift axle when the vehicle reaches the optimal position to lower the lift axle, and then returning to step 3).

Specifically, after the vehicle enters the first slope, acquiring the slope data of the road ahead of the first slope from the electronic horizon system; and if the road ahead has a second slope of which the slope value is less than or equal to the slope threshold Q, calculating the optimal position for lowering the lift axle in the road ahead of the first slope; and if the slope value of the road ahead is greater than the slope threshold Q, controlling, by the vehicle, the lift axle to remain a lifting state.

In this step, the slope threshold Q is the same as that in step 3). The slope threshold can also be set to be different from the slope threshold in step 3), such as being increased or decreased appropriately, as required.

Further, in order to make the vehicle exactly lower the lift axle when it reaches the second slope, the optimal position for lowering the lift axle is set as a position before the vehicle driving from the first slope reaches the second slope. Preferably, the optimal position for lowering the lift axle in the road ahead of the first slope is a position with a distance of $vt_2$ from the second slope, where, v is a running speed of the vehicle and $t_2$ is execution time for lowering the lift axle.

Figure 2:
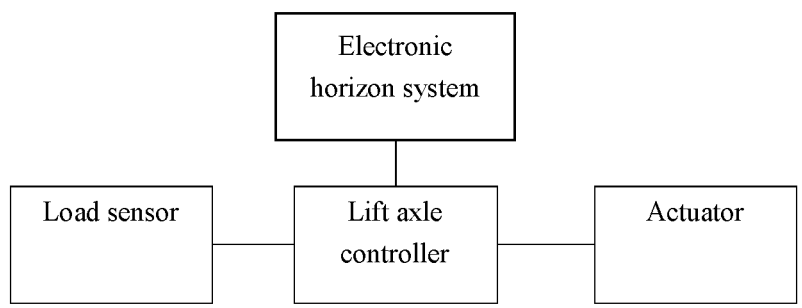
FIG. 2 is a structural schematic diagram of a system of the present disclosure.

Also provided in the present disclosure is a lift axle control system for a vehicle, wherein the system comprises a vehicle body, as shown in FIG. 2, the vehicle body is provided with a lift axle, a stationary axle, a lifting controller and an actuator, the actuator is connected with the lift axle to perform a lifting or lowering operation, the lifting controller is connected with the actuator to control an action of the actuator, wherein, the lift axle control system further comprises an electronic horizon system and a load sensor which is connected with the lifting controller to detect a load of the vehicle; the lifting controller is further connected with the electronic horizon system to acquire slope data of a road ahead and to control the lifting or lowering of the lift axle according to a lift axle control method for a vehicle as described above.

In the present disclosure, the vehicle body further comprises a frame, wheels and a suspension, etc. The stationary axle is connected through the suspension frame, the wheels are installed on the stationary axle, and these components constitute a driving system of the vehicle body.

The lift axle is also called a suspension axle, which has good economy, and can be lowered in case of a heavy-load so as to play a role of bearing weight, and can be lifted in case of no-load so that the tires of the lift axle have no friction resistance with the ground, which reduces a fuel consumption. A layout position of the lift axle also has many forms, such as in the middle or the rear axle. The actuator thereof can be classified into pneumatic, hydraulic, electric, pneumatic booster pump and other driving forms, without limitation.

The electronic horizon system includes map data, global positioning system (GPS)/Beidou positioning, and a forward search engine. It features that according to a longitude and latitude position of the vehicle analyzed by a GPS/Beidou satellite positioning system, and forward moving direction information of the vehicle, a map of the electronic horizon is searched for geographic information ahead of the vehicle, and the geographic information ahead of the vehicle is transmitted to the lifting controller through a controller area network (CAN) bus or an Ethernet bus. Specifically, the geographic information ahead of the vehicle may include slope data, corner data, speed limit data, etc.

The system of the present disclosure, combined with the load sensor and electronic horizon system, realizes automatic control of the lift axle of the vehicle by a terrain prediction method. Judging whether the lift axle is suitable for being lifted or lowered and the optimal position for executing the action by predicting the terrain and combining the load, so that the lift axle is dynamically lifted or lowered as the terrain changes when the vehicle with the same load is driving on different terrains, which not only ensure no damage to the road surface, but also utilize the lift axle to achieve the economy of fuel consumption during running of the vehicle to the maximum extent.

The above are only the preferred embodiments of the present disclosure and are not intended to limit the present disclosure in any form. Although the present disclosure has been disclosed with the preferred embodiments as above, the preferred embodiments are not intended to limit the present disclosure. Any of those skilled in the art may make many possible changes and modifications to the technical solutions of the present disclosure by using the technical content disclosed above, or modify them to equivalent embodiments without departing from the scope of the technical solutions of the present disclosure. Therefore, any simple amendments, equivalent changes and modifications made to the above embodiments according to the technical essence of the present disclosure without departing from the content of the technical solutions of the present disclosure fall within the scope of protection of the technical solutions of the present disclosure.

INDUSTRIAL APPLICABILITY

The lift axle control method and system for the vehicle of the present disclosure is to acquire the slope value of the road ahead by using the electronic horizon system and to calculate the optimal position to lift or lower the lift axle in the road ahead of the current position of the vehicle by combining the slope value. When the vehicle reaches the optimal position of lifting or lowering the lift axle in the road ahead, the vehicle is controlled to lift or lower the lift axle, so that the vehicle with the same load dynamically lifts and lowers the lift axle as the terrian changes when running on different terrains, which not only ensures no damage to the road surface, but also realizes the economy of fuel consumption of vehicle by using the lift axle to the maximum extent. The electronic horizon system is a database system that may provide the vehicle with accurate real-time information of the road ahead, and the slope information of the road ahead can be accurately obtained by the electronic horizon system; and the present disclosure is convenient to implement in industry with the aid of the electronic horizon system and a vehicle-mounted device, and various components such as the load sensor, lifting controller and actuator are also convenient to process in industry.

The invention claimed is:

1. A lift axle control method for a vehicle, wherein the lift axle control method comprises the following steps:
   step 1) acquiring a load M of the vehicle during running of the vehicle;
   step 2) judging whether the vehicle needs to lower a lift axle according to the load M, and when the vehicle needs to lower the lift axle according to the load M, controlling the vehicle to lower the lift axle, and then entering into step 3); otherwise, returning to step 1);
   step 3) acquiring information of an electronic horizon system in real time, calculating an optimal position for lifting the lift axle in a road ahead of a current position of the vehicle, controlling the vehicle to lift the lift axle when the vehicle reaches the optimal position for lifting the lift axle, and entering into step 4); and
   step 4) calculating, by the electronic horizon system, an optimal position to lower the lift axle in the road ahead, controlling the vehicle to lower the lift axle when the vehicle reaches the optimal position to lower the lift axle, and then returning to step 3).

2. The lift axle control method for a vehicle according to claim 1, wherein, in step 2), judging whether the vehicle needs to lower the lift axle according to whether the load M is greater than a threshold T; and when the vehicle needs to lower the lift axle according to the load M, controlling the vehicle to lower the lift axle.

3. The lift axle control method for a vehicle according to claim 1, wherein, in step 3), acquiring, by the vehicle, slope data of the road ahead of the current position of the vehicle from the electronic horizon system, and when the road ahead has a first slope of which a slope value is greater than a slope threshold Q, calculating the optimal position for lifting the lift axle in the road ahead.

4. The lift axle control method for a vehicle according to claim 3, wherein, assuming that the vehicle has N stationary axles and at least one lift axle; a formula for calculating the slope threshold Q is Q=arccos (NT/M), and T is a threshold.

5. The lift axle control method for a vehicle according to claim 3, wherein, the optimal position for lifting the lift axle is a position with a distance of $vt_1$ from the first slope, where v is a running speed of the vehicle and $t_1$ is execution time for lifting the lift axle.

6. The lift axle control method for a vehicle according to claim 1, wherein, in step 3), acquiring, by the vehicle, slope data of the road ahead of the current position of the vehicle from the electronic horizon system, and when a slope value of the road ahead is less than or equal to a slope threshold Q, controlling, by the vehicle, the lift axle to remain a lowered state.

7. The lift axle control method for a vehicle according to claim 3, wherein, in step 4), after the vehicle enters the first slope, acquiring the slope data of the road ahead of the first slope from the electronic horizon system; and when the road ahead has a second slope of which a slope value is less than or equal to the slope threshold Q, calculating the optimal position to lower the lift axle in the road ahead of the first slope.

8. The lift axle control method for a vehicle according to claim 7, wherein, the optimal position to lower the lift axle in the road ahead of the first slope is a position with a distance of $vt_2$ from the second slope, where, v is a running speed of the vehicle and $t_2$ is execution time for lowering the lift axle.

9. The lift axle control method for a vehicle according to claim 3, wherein, in step 4), acquiring, by the vehicle, the slope data of the road ahead of the first slope from the electronic horizon system after the vehicle enters into the first slope, and when a slope value of the road ahead is greater than the slope threshold Q, controlling, by the vehicle, the lift axle to remain in a lifting state.

10. A lift axle control system for a vehicle, wherein the lift axle control system comprises a vehicle body, the vehicle body is provided with the lift axle, a stationary axle, a lifting controller and an actuator, the actuator is connected with the lift axle to perform a lifting or lowering operation, the lifting controller is connected with the actuator to control an action of the actuator, wherein, the lift axle control system further comprises the electronic horizon system and a load sensor which is connected with the lifting controller to detect the load M of the vehicle; the lifting controller is further connected with the electronic horizon system to acquire slope data of the road ahead and to control the lifting or lowering of the lift axle according to the lift axle control method for the vehicle according to claim 1.

\* \* \* \* \*